Dec. 19, 1961  T. ISHAM  3,013,816
TOW BAR
Filed Oct. 24, 1960  2 Sheets-Sheet 1
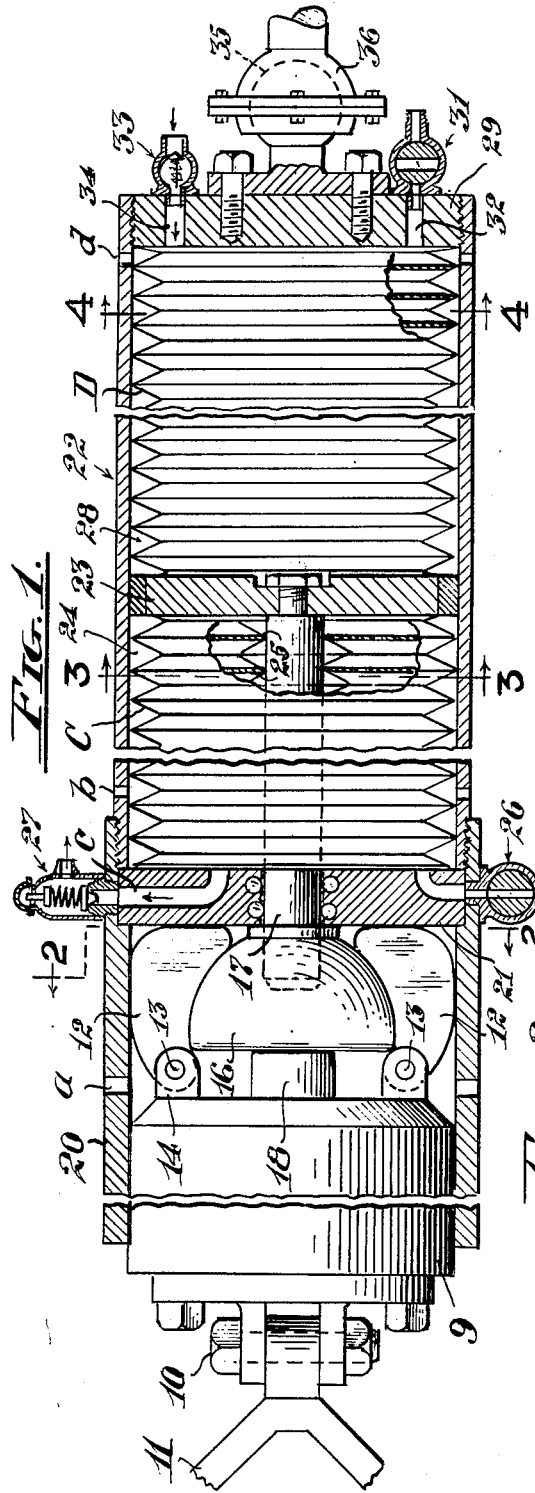
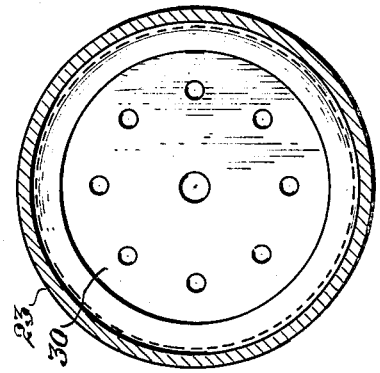
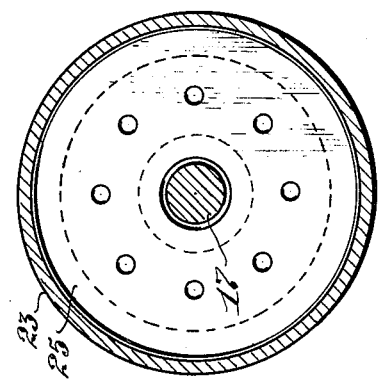
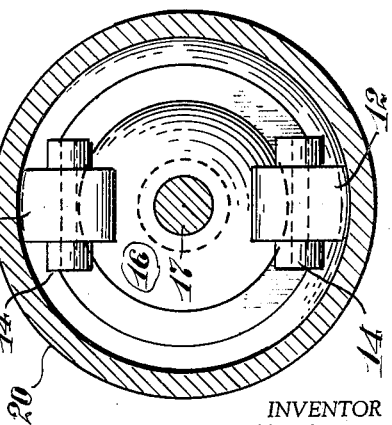
INVENTOR
Timothy Isham;
BY R. S. Berry
ATTORNEY

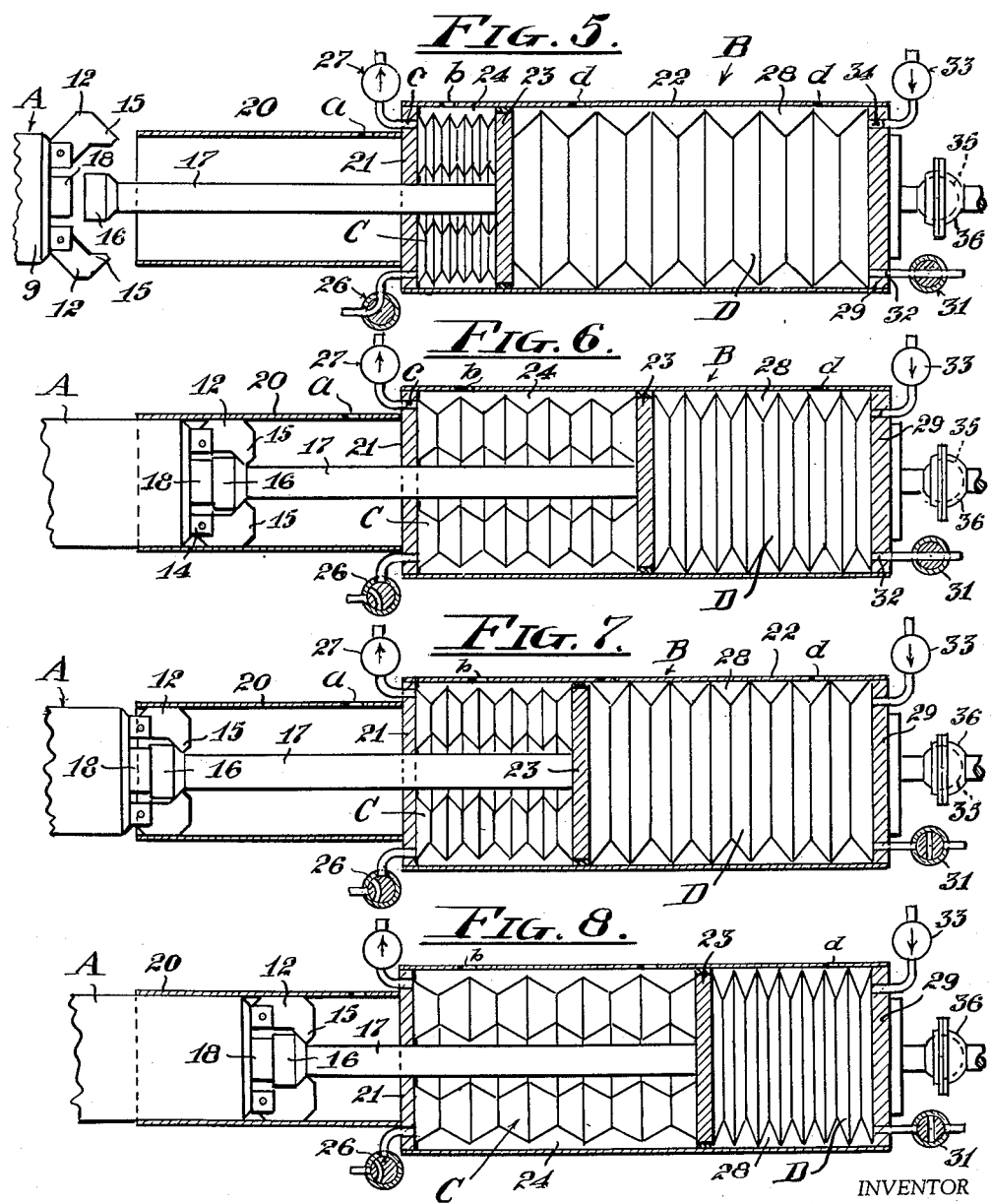

United States Patent Office 3,013,816
Patented Dec. 19, 1961

3,013,816
TOW BAR
Timothy Isham, 532 S. Hobart, Los Angeles, Calif.
Filed Oct. 24, 1960, Ser. No. 64,343
3 Claims. (Cl. 280—453)

This invention relates to a tow-bar for connection between a vehicle to be towed and a powered vehicle employed in the towing operation.

The primary object of the invention is to provide a tow-bar embodying means whereby automatic release of the tow-bar from the vehicle being towed may be effected in event excessive load be imposed on the tow-bar such as would be likely to damage the structure of a vehicle being towed, and also embodying means whereby such releasing means may be adjusted to operate under various resistance imposed thereon.

Another object is to provide a tow-bar of the above character which is especially adapted for use in towing air-craft on landing fields, particularly craft of the large heavy variety, such as jet planes and the like, where, because of the necessity of connecting tow-bars to the landing gear of the craft, damage to such landing gear may occur in event excessive towing strains are applied thereto as where greater resistance than usual is encountered in hauling the craft such as may be occasioned by pulling the craft up-grade or against strong wind currents.

Another object is to provide a tow-bar in which pulling or pushing loads imposed thereon will be cushioned on a body of confined air under pressure and wherein such cushioning will be supplemented by the action of developed negative pressure and wherein both the air pressure and negative pressure may be automatically regulated through the medium of pressure controlling mechanism all of which contributes to the production of a tow-bar which is compact and light in weight, yet capable of heavy duty performance.

With the foregoing objects in view together with such other objects and advantages as may subsequently appear, the invention resides in the parts and in the combination, construction and arrangement of parts hereinafter described and claimed, and as illustrated by way of example in the accompanying drawing in which:

FIG. 1 is a plan view of the tow-bar with portions broken away and showing parts in section;

FIG. 2 is a view in cross section and elevation as seen on the line 2—2 of FIG. 1, in the direction indicated by the arrows;

FIG. 3 is a view in section and elevation as seen on the line 3—3 of FIG. 1;

FIG. 4 is a view in cross section and elevation taken on the line 4—4 of FIG. 1;

FIGS. 5, 6, 7 and 8 are schematic diagrams illustrating the mode of operation of the tow-bar, of which FIG. 5 depicts the separable parts of the tow-bar in their uncoupled position; FIG. 6 shows the parts in their initial coupled position; FIG. 7 shows the operating parts as displaced under a pulling load; and FIG. 8 depicts the parts as disposed under the thrust of a pushing load.

Referring to the drawings more specifically A and B indicate respectively the separable sections of the tow-bar of which the section A is designed for attachment to a vehicle to be towed, such as an air-craft and section B is adapted for connection to a towing vehicle, such as a powered tractor. As here shown, the section A embodies a length of cylindrical tubing 9 the ends of which are closed, with one end of the tubing connected by a pivot pin 10 to a yoke 11 adapted to be attached to the running gear of an air craft in a usual manner not here shown.

The other end of the tubing 9 is equipped with a pair of latching tongs 12—12 pivoted at 13 to pairs of lugs 14—14 on the outer end of the tubing 9, the latching tongs 12—12 being moveable toward and away from each other on the pivots 13 and having inturned outer end portions 15—15 adapted to releasably engage a knob 16 on the outer end of a piston rod 17 embodied in the section B as will presently be described. A resilient bumper 18 is mounted on the outer end of the tube 9 against which the outer end of the knob 16 is adapted to abut when the sections A and B are interconnected.

The section B embodies a cylindrical tube 20 forming an end thereof which tube is open at its outer end and is adapted to receive the outer end portion of the tube 9 in freely slidable telescopic engagement therewith. The tube 20 has apertures $a$ adjacent the inner end thereof through which air may pass in and out of the tube 20 on relative longitudinal movement of the tubes 9 and 20 when in telescoped engagement with each other. The inner end of the tube 20 connects with an end wall 21 on a cylinder 22 forming the other end of the section B in which cylinder is reciprocally mounted a piston 23 to which the piston rod 17 is attached with the rod 17 slidably extending through the end wall 21. The cylinder 22 has a chamber 24 extending between the end wall 21 and piston 23 which chamber opens to atmosphere through vents $b$ in the cylinder 22.

Arranged in the chamber 24 is an annular bellows C which encompasses the piston rod 17 and extends between the end wall 21 and piston 23 and has its ends in sealed engagement with said wall and piston. Annular bounce-dampening perforated plates 25 are mounted in the folds of the bellows C as shown in FIG. 3.

When the piston 23 is in the position shown in FIG. 5 the knob 16 on the outer end of the piston rod 17 is disposed in an extended position beyond the open outer end of the tube 20 where it is subject to being engaged by the tongs 12—12. The bellows C is then open to atmosphere through a then open valve 26 in the end wall 21 and is subject to being inflated by the introduction of air under pressure delivered through the valve 26 from a suitable source of air supply so as to distend the bellows C and thereby retract the piston 23 and knob 16 into the position shown in FIG. 6, with the tongs 12—12 attached, after which the valve 26 is closed.

The end wall 21 is also equipped with an adjustable outwardly opening pressure relief valve 27 communicating with the interior of the bellows C through a passage $c$ in the end wall 21 which valve 27 functions to vent excessive air pressure from the bellows C in the operation of the tow-bar, as will presently be described.

Mounted in the chamber 28 extending between the piston 23 and the outer end wall 29 of the section B is a cylindrical bellows D having its ends connected to the piston 23 and end wall 29 in sealed engagement therewith. Circular bounce-dampening perforated baffle plates 30 are mounted in the folds of the bellows D which plates also serve to support the bellows D against diametrical collapse when the interior of the bellows is under negative pressure. The chamber 28 is open to atmosphere through vent $d$ in the cylinder 22 to permit ingress and egress of air according to contraction and expansion of the bellows C and D. The bellows D is designed to contain air at atmospheric pressure while the tow-bar is in its uncoupled and initially coupled positions shown in FIGS. 5 and 6, for which purpose the end wall 29 is fitted with a manually operable valve 31 at the outer end of a passage 32 leading to the interior of the bellows D and which valve is positioned to open said passage when the parts are disposed as shown in FIG. 5 and when the parts are initially disposed as shown in FIG. 6.

The valve 31 is then operated to close the passage 32 while the parts are in the towing position shown in FIGS. 7 and 8. During the towing operation as shown in FIG. 7 the interior of the bellows D is under negative pressure the extent of which is automatically controlled by means of an inwardly opening relief valve 33 controlling a passage 34 leading through the end wall 29 to the interior of the bellows D, which valve is adjustable to open to atmosphere under the influence of any desired extent of negative pressure imposed on the inner side of the valve obviously opens under the action of atmospheric pressure bearing on its outer side.

The section B is adapted to be connected to a powered vehicle such as a tractor for which purpose the end wall 29 is fitted with the ball element 35 of a conventional ball and socket coupling the socket element 36 of which is attached to the towing vehicle in the usual manner.

In the operation of the invention, the sections A and B of the tow-bar being disconnected as shown in FIG. 5 with the piston 23 retracted and the bellows C and D having their interiors open to atmosphere through the open valves 26 and 31 respectively, the sections A—B are interconnected by folding the tongs 12—12 inwardly over the knob 16 followed by advancing the tubes 9 and 20 into telescopic relation to each other to the position shown in FIG. 6 which operation may be effected either before or after connecting the sections A—B to their respective vehicles.

The tongs 12—12 will then be encompassed by the tube 20 and thereby held in engagement with the knob 16, and the piston 23 will be advanced in the cylinder 22 to a point intermediate the ends thereof thereby expanding the bellows C and contracting the bellows D. In this operation the valves 26 and 31 being open, expansion of the bellows C will effect intake of air thereinto while contraction of the bellows D will effect discharge of air therefrom. The bellows C and D will then contain air at atmospheric pressure.

The valve 31 is then closed thus entrapping the air under pressure therein, while the valve 26 is then utilized as a means for introducing air under pressure into the bellows C from a suitable source to thereby build up a body of compressed air within the bellows C of predetermined pressure in accordance with the load to be hauled and such as to offer cushioned resistance to the pull imposed on the tow-bar during the towing operation. In event excessive pressure should be developed in the bellows C the relief valve will open according to its adjustment to thereby relieve such pressure. An important feature of the invention resides in the action of the bellows B during movement of the piston 23 under the pull thereon wherein the bellows B is elongated under such movement to thereby develop negative pressure therein which acts to offer resistance to advance of the piston in co-operation with the resistance offered by the air under compression in the bellows C.

In event the pulling load imposed on the piston 23 should for any reason become abnormally excessive, that is, such as would be likely to damage the portion of the vehicle being towed to which the tow-bar is attached, such excessive load will act, according to adjustments of the valves 27 and 33, to advance the piston 23 until the knob 16 on the outer end of the piston rod 17 and the tongs 12 clear the outer end of the tube 20 so that the tongs 12 will be caused to spread apart and thereby be disengaged from the knob 16 thus automatically separating the sections A—B of the tow-bar thereby relieving the pull on the towed vehicle. The sections may then be re-assembled as before described.

In event the tow-bar is to be employed in a pushing operation as shown in FIG. 8 wherein a thrust will be imposed on the piston 23, the bellows D is initially inflated to confine air therein under desired pressure, and the bellows C sealed to confine air therein at atmospheric pressure when in its normal position. In this instance on advance of the piston under a thrust thereon such movement will be cushioned by the yieldable resistance afforded by compressed air in the bellows D as the latter is contracted under the urge of the piston supplemented by the development of negative pressure in the bellows C as the latter is expanded.

While I have shown and described a specific embodiment of the invention, I do not limit myself to the exact details of construction set forth, and the invention embraces such changes, modifications and equivalents of the parts and their formation and arrangement as come within the purview of the appended claims.

I claim:

1. In an automatically releasable tow-bar embodying separable end sections, a cylinder embodied in one of said end sections, an open end tube on one end of said cylinder, a reciprocal piston in said cylinder, a piston rod leading from said piston into said tube, a knob on the outer end of said piston rod, tongs on the other of said end sections engageable with said knob adapted to be positioned in and encompassed by said tube in engagement with said knob when said piston is in an advanced position whereby said tongs will be held against release from said knob; said tongs being automatically disengageable from said knob when said piston is in its retracted position; and means in said cylinder yieldably retarding retraction of said piston.

2. The structure called for in claim 1 wherein said last named means comprises a bellows in said cylinder on one side of said piston containing fluid under pressure, and a bellows connected to the other side of said piston having its interior under negative pressure.

3. The structure called for in claim 1 together with means for regulating said last named means for varying the resistance thereof to retraction of said piston.

References Cited in the file of this patent

UNITED STATES PATENTS

| | | |
|---|---|---|
| 1,323,634 | Kagay | Dec. 2, 1919 |
| 2,102,722 | Kortering | Dec. 21, 1937 |
| 2,541,356 | Hansmann | Feb. 13, 1951 |
| 2,919,883 | Murphy | Jan. 5, 1960 |